June 7, 1927.
L. B. NORDLUND
1,631,326
CHANGE RETURNING DEVICE
Filed May 21, 1924
5 Sheets-Sheet 1
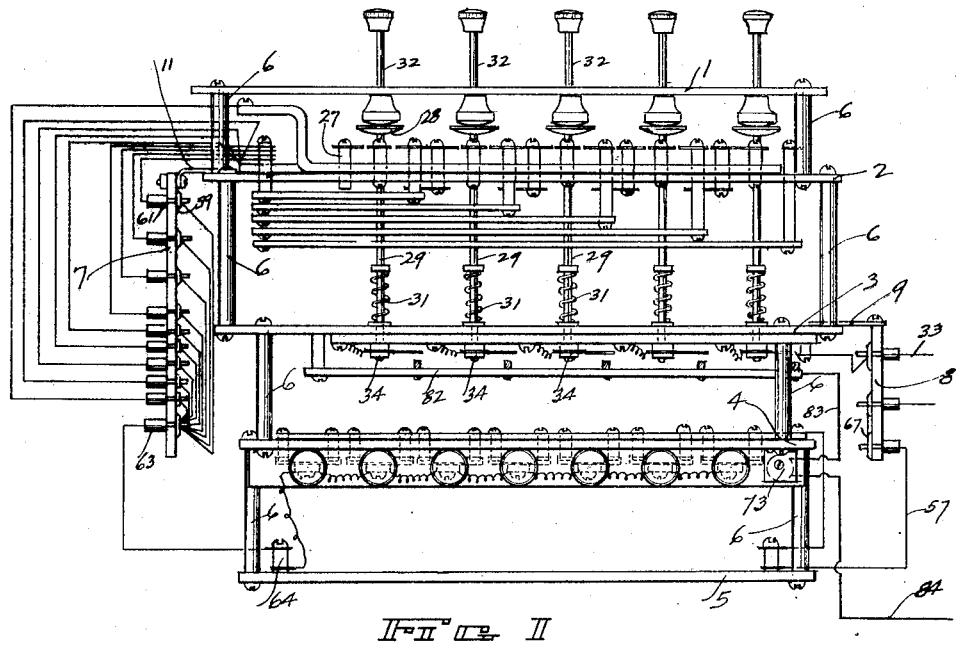
FIG. II
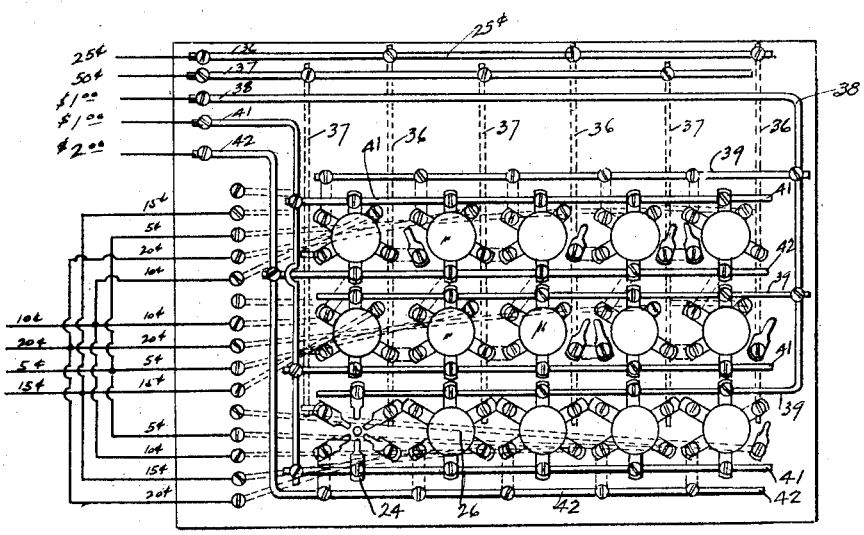
FIG. III
INVENTOR
L. B. NORDLUND
BY
ATTYS June 7, 1927.
L. B. NORDLUND
1,631,326
CHANGE RETURNING DEVICE
Filed May 21, 1924 5 Sheets-Sheet 2
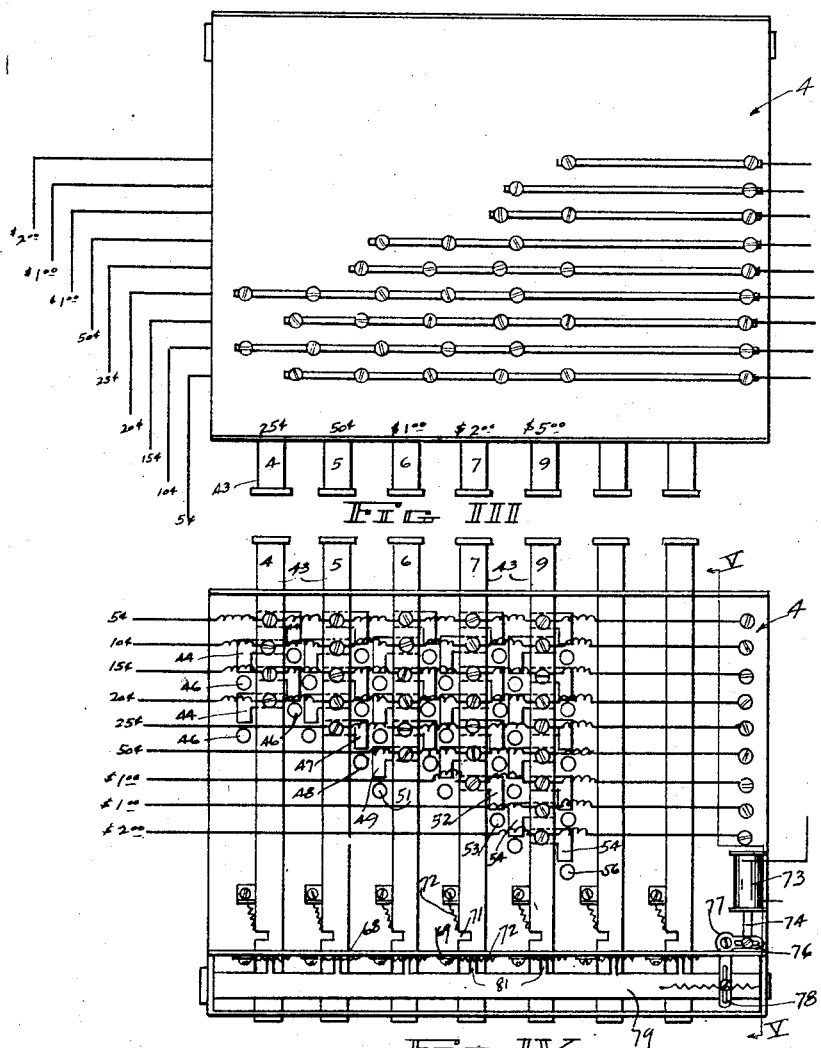
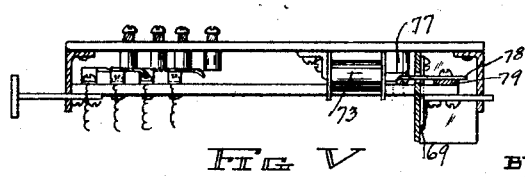
INVENTOR
L. B. NORDLUND
ATTYS June 7, 1927.
L. B. NORDLUND
1,631,326
CHANGE RETURNING DEVICE
Filed May 21, 1924    5 Sheets-Sheet 3
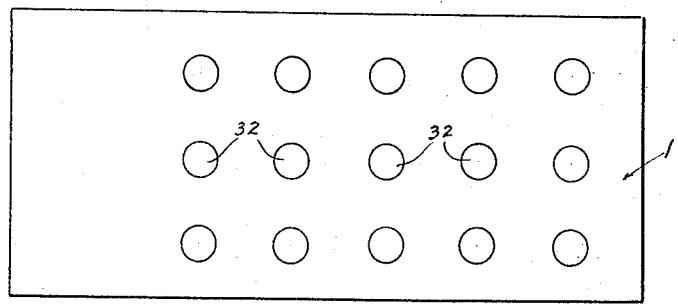
FIG. VI
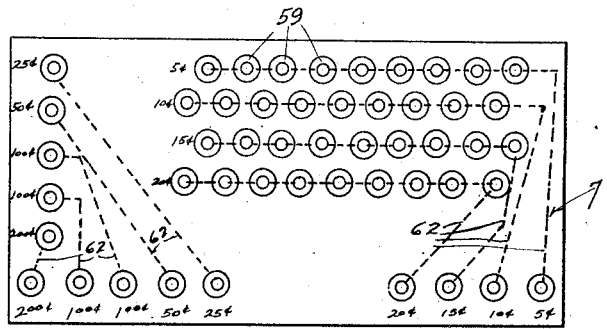
FIG. VII
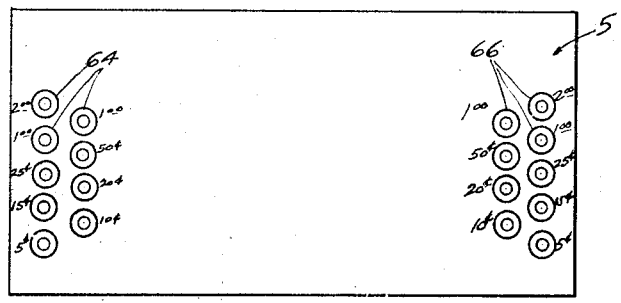
FIG. VIII
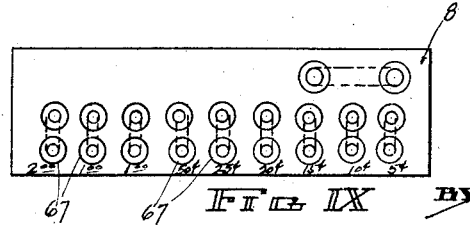
FIG. IX
INVENTOR
L. B. NORDLUND
ATTYS June 7, 1927.
L. B. NORDLUND
1,631,326
CHANGE RETURNING DEVICE
Filed May 21, 1924 5 Sheets-Sheet 4
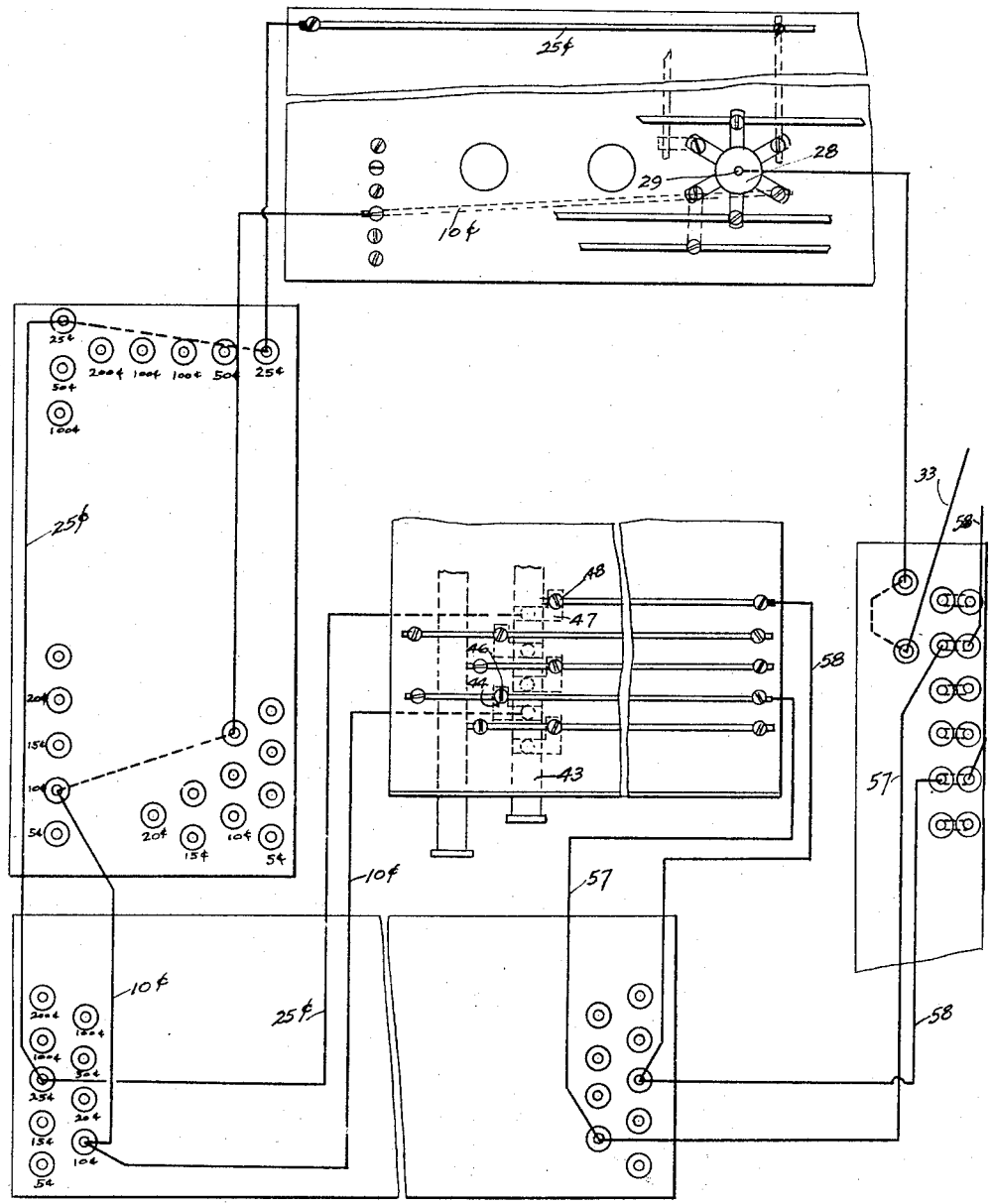
FIG X
INVENTOR
L. B. NORDLUND
BY
ATTYS

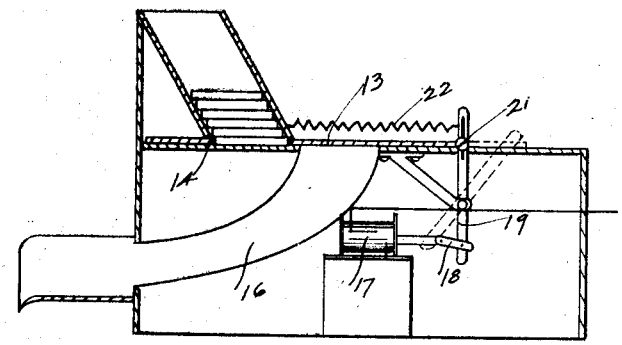
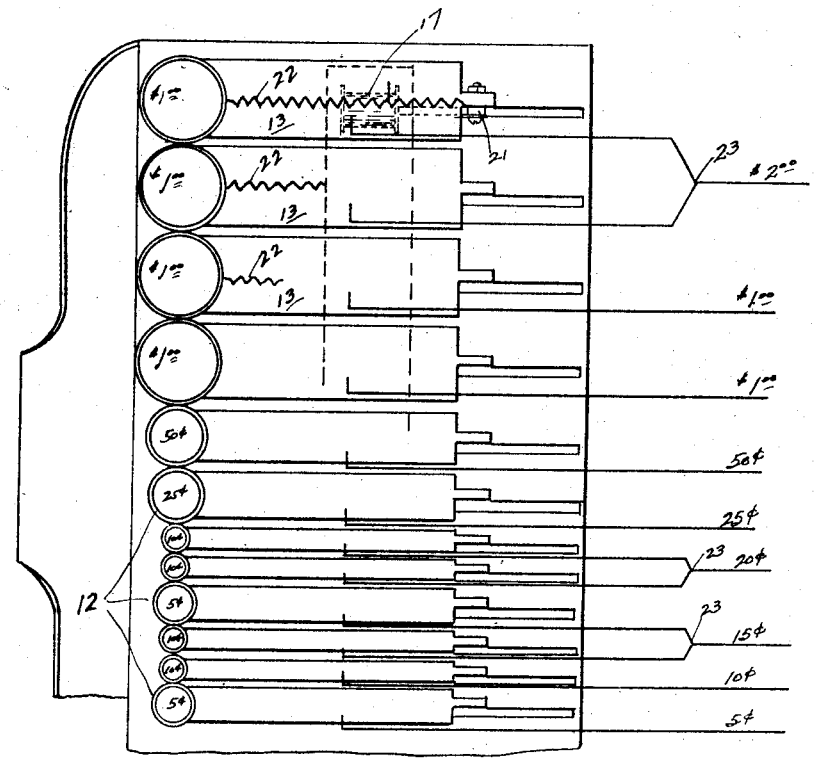

Patented June 7, 1927.

1,631,326

UNITED STATES PATENT OFFICE.

LUDVIG B. NORDLUND, OF SAN FRANCISCO, CALIFORNIA.

CHANGE-RETURNING DEVICE.

Application filed May 21, 1924. Serial No. 714,907.

The present invention relates to improvements in electrical change returning devices and constitutes an improvement of my invention described in United States Patent No. 1,506,250, issued August 26, 1924. The principal object of the invention is to provide a device by means of which the operator when selling tickets or similar units of merchandise need only press a button indicating the number of units sold and a second button indicating the amount of money deposited by the purchaser, whereupon the machine will automatically return the proper change.

In the machine described in the prior application the underlying principle of the machine was to provide electrically operated means for returning the total amount received in smaller units of money and to provide means in combination therewith withholding such units as would correspond in value to the value of the merchandise sold. In the present invention a different principle is used. Electrical circuits containing electromagnets, which latter are instrumental in delivering the change from stacks of coins, are arranged so that each circuit returns a certain amount of change which has been previously determined for that particular circuit, but this change is correct only if a maximum amount of money, as for instance $5.00, has been deposited.

If the price of the tickets sold is 15¢, for instance, one of these circuits is arranged to return $4.85. Since this is the proper change on a $5.00 bill only, an additional means is provided for reducing the change to the proper amount in accordance with the coin actually deposited, that is, means are provided allowing the change of $4.85 to be reduced to 85¢ if only $1.00 has been deposited, or to 35¢ if only 50¢ has been deposited.

It is proposed in the present invention to provide a certain switch mechanism and an arrangement of conducting rods in connection therewith allowing a large number of different circuits to be concentrated and conveniently operated in a small space, the switch arrangement being furthermore such as to allow each individual contact to be readily adjusted and to be removed from an operative position where the particular combination desired calls for such removal.

Further objects and advantages of my invention will appear as the specification proceeds.

The preferred form of my invention is illustrated in the accompanying drawings, in which Figure 1 shows a front view of my device, Figure 2 a plan view of the main switch panel, Figure 3 a top plan view of a second panel illustrating a second switch arrangement, Figure 4 a bottom plan view of the latter arrangement, Figure 5 a section taken along line V—V of Figure 4, Figure 6 a plan view of a top panel supporting a number of buttons for actuating the first switch arrangement, Figure 7 a detail view of a side panel shown on the left-hand side in Figure 1, Figure 8 a detail view in plan of a bottom panel, Figure 9 a detail view of a side panel shown on the right-hand side of Figure 1, Figure 10 a wiring diagram showing the circuits for one complete transaction, Figure 11 a vertical section showing an arrangement for withdrawing coins from the bottom of a stack and Figure 12 a plan view of the latter arrangement. While I have shown only the preferred form of my invention, I wish to have it understood that various changes or modifications may be made within the scope of the claims hereto attached without departing from the spirit of the invention.

The supporting structure for my device consists preferably of five horizontal panels, (1), (2), (3), (4) and (5) held in spaced relation to one another by suitable spacing members (6) and two side plates (7) and (8) held on opposite sides of the device by means of brackets (9) and (11).

The machine designed according to the principles of the present invention should be constructed and set for a certain range of tickets or other articles of merchandise and is also made to be limited to a certain maximum amount of deposit made by the purchaser.

For the purpose of the present invention it will be assumed that $5.00 is the maximum amount that may be deposited by any purchaser and that the articles of merchandise to be sold are tickets of a motion picture theater or the like. These tickets are sold in three different denominations of 5¢, 10¢ and 15¢ and the maximum range of the apparatus is designed for five tickets of one kind. It is proposed then in the present description to describe a machine that will return change on any sale made not involving more than five tickets of one kind of the three denominations and not involving a deposit of more than $5.00.

It will be noted that in this arrangement there will be no change involving a figure not a multiple of five. It should be further understood that any possible change that may have to be returned will constitute a combination of 5¢, 10¢, 15¢, 20¢, 25¢, 50¢, $1.00, $1.00 and $2.00. If for instance only a single 5¢ ticket is sold and the purchaser deposits a $5.00 bill, he is entitled to a change of $4.95 which may be made up of four single dollars, a 50¢ piece, 25¢ piece, and a 20¢ piece, which latter in view of the fact that no 20¢ coin is provided in United States money has to be made up of two 10¢ pieces.

To allow of the return of any possible combination I therefore arrange stacks of coins (12) in the manner illustrated in Figures 11 and 12, causing two stacks to cooperate where it is necessary to use a coin not provided in United States money.

In this arrangement the stacks are marked with the respective values of the coins contained therein. Single stacks are provided for 5¢, 10¢, 25¢, 50¢ and $1.00 values, while double stacks are used to represent 15¢, 20¢ and $2.00. Since in United States money there is a $2.00 bill which might call for a change of $1.00 and a fraction, one stack of individual dollars must be provided and four dollar stacks being necessary I provide two individual ones and two combined into one.

Each stack is arranged with a slide (13) formed with an opening (14) allowing the lowermost coin of the stack to drop thereinto so that the latter coin may be withdrawn from the stack and discharged into a chute (16), when an electromagnet (17) is energized which through a link (18) pulls on one end of a lever (19), the distant end of which engages with the slide (13) as shown at (21). A spring (22) returns the slide to an operative position for the reception of a new coin.

Each single stack is provided with its particular electromagnet, and the two electromagnets of each double arrangement for the production of 15¢, 20¢, et cetera, are connected to a single wire as shown in Figure 12 at (23) so that the two stacks will be manipulated as a single unit.

The object of the main switch arrangement supported on the panel (2) and illustrated in detail in Figure 2 is to provide means whereby the operator is enabled to energize by depressing a button corresponding to the number and kind of tickets sold the proper electromagnets that will return the proper change on a $5.00 deposit. For this purpose I provide three rows of switches corresponding to the three denominations of tickets to be sold and I provide five switches in each row, since the limit of an individual sale is five tickets.

Each switch consists of six stationary contacts (24) grouped around a central point in peripheral arrangement so as to be adapted to be simultaneously engaged by an axially movable contact (26). The stationary contacts (24) are made of small leaves of conducting material pivoted to posts (27) rising from the panel (2), the leaves being preferably made slotted to allow of sliding adjustment of the same whereby they may be readily removed into an inoperative position relative to the movable contact. These latter contacts are formed by buttons (28) secured on the upper ends of stems (29) which latter are slidably supported in the two panels (2) and (3) with springs (31) tending to force the same upwardly so as to disconnect the buttons from the stationary contacts.

For the convenient manipulation of the movable contacts I provide operating members (32) which are slidable in the upper plate (1) and bear on the buttons (28) so that by depressing the operating members (32) the movable contacts are engaged with the stationary contacts.

Adhering to the special example selected for the purposes of this description, fifteen movable contacts are shown, and the wire (33) shown on the right hand side of Figure 1, which wire may be connected to any suitable source of energy, is split into fifteen parts to connect with the stems (29) of the movable contacts as shown at (34).

At the switch each of the fifteen split circuits thus formed is again divided into six circuits by the six stationary contacts grouped around each movable contact. The six stationary contacts of each switch are connected, disregarding the second switch arrangement for the time being, to electromagnets of stacks of coins of such denominations as will make up the proper change for the tickets sold on a $5.00 deposit.

For the study of this arrangement particular reference is had to Figure 2, from which it will be seen that one bar designated as the 25¢ bar and connecting with the electromagnet of the 25¢ stack has three bars (36) extending therefrom running transversely to the rows of switches and connecting with one stationary contact of each switch. A second bar marked as the 50¢ bar and connecting with the electromagnet of the 50¢ stack has bars (37) extending therefrom running transversely to the rows of switches and also connecting with one stationary contact of each switch.

These transverse bars (36) and (37) are preferably arranged underneath the panel as shown by the fact that they are dotted in the drawing. A $1.00 bar running parallel to the 25¢ and 50¢ bars and turning to follow the edge of the panel as shown at (38) has longitudinal bars (39) extending therefrom to run parallel to the rows, the three bars connecting with one stationary contact of each switch. In a similar manner does the second $1.00 bar send runners (41) between the rows of switches to connect with a second stationary contact on each switch.

Finally the $2.00 bar sends two branches (42) into the arrangement, the two branches also connecting with a stationary contact on each switch.

The arrangement thus far described accounts for five contacts of each switch, namely: 25¢, 50¢, $1.00, $1.00, $2.00. The sixth contact of each switch is made a variable factor and is set for each particular machine to make up the correct change in combination with the other five contacts. For instance, assuming that the lower row in Figure 2 is intended for 5¢ tickets, the second row for 10¢ tickets, and the third row for 15¢ tickets, the first switch in the first row has to return a change of $4.95, since it sells one 5¢ ticket only. The five stationary contacts making up the sum of $4.75, it is necessary that the sixth contact furnish an additional sum of 20¢ and the latter contact is therefore connected to the wire marked 20¢, which latter leads to the electromagnet of the two 10¢ stacks combined into 20¢.

The second switch returns $4.90 and its sixth contact has to provide for the return of 15¢ and is therefore connected to the electromagnet of the 15¢ stack. The sixth contacts of the third and fourth switch respectively are connected to the 10¢ and 5¢ stacks, while the sixth contact of the fifth switch is turned around so as to be disconnected, since in the particular example selected the five stationary contacts will return $4.75, which is all that is required on a five-ticket purchase.

Progressing to the second row of switches, which is made for 10¢ tickets, the change required to be returned by the first switch will be $4.90 and the sixth contact therefore connects with a 15¢ wire. Similarly the second switch connects with a 5¢ wire. The third switch calls for a return of $4.70 and in this case it is necessary to eliminate the 25¢ contact by turning the same on its pivot. The four remaining contacts will return $4.50 and the sixth contact is connected for 20¢, making a total of $4.70. In a similar manner are the remaining switches connected for the proper change to be returned on a $5.00 bill.

As described thus far the device returns change on a maximum amount of $5.00 only, and the problem next to be discussed is to reduce the change so as to make the same correct for any amount actually deposited by the purchaser.

For this purpose I use the second switch arrangement shown in Figures 3, 4 and 5. It will be readily seen by viewing Figure 2 that nine different wires lead away from the same, namely wires for 5¢, 10¢, 15¢, 20¢, 25¢, 50¢, $1.00, $1.00, $2.00, assuming that the three wires of equal denominations are joined into one.

Instead of leading directly to their respective electromagnets they are connected to the keys (43) provided under the panel (4) and consisting of horizontal bars mounted in parallel relation with freedom of sliding motion. The first one of these keys has four clips (44) extending therefrom, two on each side, which latter are adapted to make contact with stationary contacts (46) when the key is pushed inwardly by the operator. The clips (44) of the first key are connected to the 5¢, 10¢, 15¢ and 20¢ wires respectively, and the stationary contacts (46) of the first key are connected to the electromagnets of the 5¢, 10¢, 15¢ and 20¢ stacks.

The second key (43) has an additional clip (47) which is connected to the 25¢ wire, and a fifth stationary contact (48) which is connected to the electromagnet of the 25¢ stack.

The third key, while having all the clips of the former keys, has an additional clip (49) connecting with the 50¢ wire and a stationary contact (51) connecting with the electromagnet of the 50¢ stack.

The fourth key has an additional clip (52) connecting with the first single dollar wire, and a stationary contact (53) connecting with the electromagnet of the first single dollar stack, and the last key has two additional clips (54), and two stationary contacts (56) establishing communication between the last two wires and the electromagnets of the last two stacks.

When the fifth key (43) is depressed, all the nine wires emanating from the upper switch arrangement are connected with the electromagnets, which means that change will be returned on the maximum amount of $5.00. When the operator therefore wishes to return change on $5.00 she will press the fifth key which will return the proper amount, provided the proper key of the upper switchboard is depressed simultaneously. If the purchaser hands in a $2.00 bill, the change is reduced by $3.00 and the operator will depress the fourth key which eliminates the two last circuits, namely, a $1.00 and a $2.00 circuit, and returns only the change on $2.00. In a similar manner the third key returns change on $1.00, the second key on 50¢ and the first key on 25¢.

One entire operation is graphically illustrated in Figure 10, in which instance the purchaser wishes to buy three five-cent tickets and deposits 50¢. The operator depresses the third button of the first row of the upper switch panel and the second key of the second switch panel. A current then flows from the wire (33) into the stem (29) of the movable switch (28), then divides, one branch including the 10¢ wire and leading to the clip (44) of the key (43), which latter connects through the stationary contact (46) with the wire (57) which latter connects with the electromagnet of the 10¢ stack.

The other branch leads from the 25¢ stationary contact to the 25¢ bar and wire connections marked 25¢ into the clip (47), which latter through the stationary contact (48) connects with the wire (58) which leads to the electromagnet of the 25¢ stack.

To combine the whole arrangement into a suitable unit and to facilitate the setting of the device for different combinations, I have selected the structural features shown in Figure 1. Panel (2) has been pointed out as supporting the main switch arrangement, while panel (4) supports the second switch arrangement and panel (3) guides in connection with panel (2) the stems (29) of the movable contacts.

The upper plate (1) is superimposed to guide the operating members (32). It has been pointed out that the upper switch arrangement is particularly adapted to facilitate the removal of individual contacts from operative positions, and it might be further pointed out that many of those contacts are arranged that they may be easily made to slip over one another in case it is desired to connect adjacent stationary contacts of adjacent switches.

To further facilitate the rearranging of the device, I provide the left hand panel (7) which is perforated at suitable places and provided with jacks (59) adapted to receive suitable plugs (61) at the ends of the different wires emanating from the upper switch panel. It will be noted that four rows of jacks are provided for the 5¢, 10¢, 15¢ and 20¢ wires respectively allowing any desired combination of those wires to be accommodated on the panel (7).

Jacks for the 25¢, 50¢, $1.00, $1.00 and $2.00 wires are connected with a horizontal row of similarly arranged jacks by means of wires (62) which latter are adapted to receive plugs (63) of wires connecting with posts (64) on the lowermost panel (5) from where the wires are guided to their respective connections on the keys of the panel (4), and the stationary contacts on the said panel are connected to binding posts (66) on the lowermost panel (5) from which point connections are made with jacks (67) on the right hand side panel (8). From here the wires lead to their respective electromagnets.

It has been seen that the operation of my device requires the simultaneous handling of two switches, namely, one on the upper switch panel and one on the lower switch panel. To facilitate the operation I provide locking means for the keys of the lower switch arrangement which is automatically released after the upper switch has become active. The details of this construction are shown in Figures 4 and 5.

Near the rear end of the keys a transverse member (68) has a plurality of short clips (69) pivoted thereto adapted to be drawn into engagement with notches (71) in the keys (43) by a spring (72) whenever a key is depressed. The key thus remains locked in its circuit closing position until released by means of the electromagnet (73) which latter at the proper time becomes energized and pushes through its plunger (74) on one arm (76) of a bell crank lever (77) causing the other arm (78) to push a second transverse member (79) to the left as viewed in Figure 3, causing one of a number of dogs (81) extending from the transverse member (79) to push the clip (69) out of the notch (71) whereupon the key is returned to an inactive position by the spring (72).

The electromagnet (73) is energized after a switch of the upper switch arrangement has been closed and the proper change has been returned by means of the stem (29) contacting a bar (82) (see Figure 1), which latter is connected to the wire (83) which leads to the electromagnet (73) and from there joins in a return wire (84) so as to form a complete circuit.

I claim:

1. In a change returning device of the character described, a double control for a plurality of change returning circuits, one control closing gaps in circuits returning change on a possible maximum deposit and the second control completing those of the said circuits only which return change on the actual deposit.

2. A device for returning change on an amount deposited for the purchase of units of merchandise, comprising a source of electrical energy, a conductor connected therewith split into a plurality of conductors corresponding to combinations of units that may be purchased, a switch for each of said conductors allowing the same to be connected into a combination of individual conductors releasing, when connected, the change called for by a maximum deposit and a second switch arrangement including a plurality of switches allowing the operator to connect those individual conductors only which return change on the deposit actually made.

LUDVIG B. NORDLUND.